United States Patent
Rogers

(10) Patent No.: US 11,166,405 B1
(45) Date of Patent: Nov. 9, 2021

(54) SEED PLANTING DEVICE AND METHOD OF USE

(71) Applicant: Bruce Rogers, Washington, UT (US)

(72) Inventor: Bruce Rogers, Washington, UT (US)

(*) Notice: Subject to any disclaimer, the term of this patent is extended or adjusted under 35 U.S.C. 154(b) by 0 days.

(21) Appl. No.: 16/868,317

(22) Filed: May 6, 2020

(51) Int. Cl.
*A01C 7/02* (2006.01)
*A01C 7/20* (2006.01)
*A01C 7/00* (2006.01)

(52) U.S. Cl.
CPC ............ *A01C 7/02* (2013.01); *A01C 7/002* (2013.01); *A01C 7/206* (2013.01)

(58) Field of Classification Search
CPC .......... A01C 7/02; A01C 7/002; A01C 7/206; A01C 5/02; A01B 1/00; A01B 1/24; A01B 1/243; A01B 45/00; A01B 45/02; A01B 49/06
USPC ........................... 111/95, 107, 115; D8/1, 13
See application file for complete search history.

(56) References Cited

U.S. PATENT DOCUMENTS

| | | | | |
|---|---|---|---|---|
| 1,020,762 A | * | 3/1912 | Judson | F25C 5/043 30/164.8 |
| 1,439,601 A | * | 12/1922 | Boop | A01C 7/02 111/92 |
| 1,893,258 A | * | 1/1933 | Washburn | A01B 1/243 172/21 |
| 1,965,177 A | * | 7/1934 | Finkl | A01B 1/24 172/21 |
| 2,291,160 A | * | 7/1942 | Johnson | A01B 1/24 172/247 |
| 2,415,900 A | * | 2/1947 | Myles | A01C 5/00 222/134 |
| 2,663,462 A | * | 12/1953 | Johnson | A01C 7/02 222/167 |
| 2,987,018 A | * | 6/1961 | Vath | A01G 20/30 111/8 |
| 4,511,004 A | * | 4/1985 | Deneen | A01B 45/02 172/21 |
| 4,760,807 A | * | 8/1988 | Keller | A01C 7/02 111/92 |
| 4,791,995 A | * | 12/1988 | Hochlan, Jr. | A01B 1/06 111/99 |
| 5,080,027 A | * | 1/1992 | Brothers | A01C 5/02 111/115 |
| 5,152,348 A | * | 10/1992 | Flanagan, Sr. | A01B 45/023 111/99 |
| 5,433,278 A | * | 7/1995 | Shipley | A01B 1/00 172/370 |
| 5,438,940 A | * | 8/1995 | Bristow | A01C 5/02 111/115 |

(Continued)

FOREIGN PATENT DOCUMENTS

CN 107409549 12/2017
CN 107409549 A * 12/2017

(Continued)

*Primary Examiner* — Jamie L McGowan
(74) *Attorney, Agent, or Firm* — David R. Conklin; Kirton McConkie

(57) ABSTRACT

A planting device may include a platform having a top surface, a bottom surface, and an aperture. Either a projection that extends from the bottom surface or a planting tube that extends from the top surface may be configured couple to the aperture. The projection and the planting tube may be interchangeable. The planting device may further include a handle extending from the top surface.

19 Claims, 7 Drawing Sheets

(56) References Cited

U.S. PATENT DOCUMENTS

| | | | | |
|---|---|---|---|---|
| 5,709,273 A * | 1/1998 | Roth | | A01B 1/22 |
| | | | | 172/22 |
| 5,813,471 A * | 9/1998 | Ramsey | | A01B 1/243 |
| | | | | 172/21 |
| 6,024,034 A * | 2/2000 | Howell | | A01C 7/02 |
| | | | | 111/92 |
| 6,142,241 A * | 11/2000 | Finley | | A01C 5/02 |
| | | | | 172/378 |
| 6,289,828 B1 * | 9/2001 | Wittenberg | | A01C 5/02 |
| | | | | 111/106 |
| 6,427,613 B1 * | 8/2002 | Reidel | | A01B 1/243 |
| | | | | 111/130 |
| 6,662,736 B1 * | 12/2003 | Lowe | | A01B 1/24 |
| | | | | 111/900 |
| 6,920,938 B1 * | 7/2005 | Rotan | | A01B 45/02 |
| | | | | 172/21 |
| 8,056,646 B2 * | 11/2011 | Broadstone | | A01C 5/02 |
| | | | | 172/378 |
| D668,920 S * | 10/2012 | Sandoval | | D8/1 |
| 8,347,797 B1 * | 1/2013 | Clay | | A01C 7/02 |
| | | | | 111/92 |
| 8,714,275 B1 * | 5/2014 | Ng | | A01B 1/243 |
| | | | | 172/22 |
| 9,661,805 B1 * | 5/2017 | Conrad | | G01N 21/553 |
| 9,686,974 B2 * | 6/2017 | Cink | | A01N 25/02 |
| 9,795,075 B2 * | 10/2017 | Pratt | | A01C 5/02 |
| 2006/0162629 A1 * | 7/2006 | Gallant | | A01C 7/02 |
| | | | | 111/92 |
| 2009/0223685 A1 * | 9/2009 | Garcia | | A01B 45/02 |
| | | | | 172/22 |
| 2014/0338578 A1 * | 11/2014 | Pratt | | A01C 7/02 |
| | | | | 111/99 |
| 2015/0327432 A1 * | 11/2015 | Kim | | A01B 1/20 |
| | | | | 111/7.1 |

FOREIGN PATENT DOCUMENTS

| | | | | |
|---|---|---|---|---|
| DE | 330688 | | 12/1920 | |
| DE | 330688 C | * | 12/1920 | ............... A01C 7/02 |
| DE | 202015005416 | | 9/2015 | |
| DE | 202015005416 U1 | * | 9/2015 | ............... A01C 5/02 |

* cited by examiner

SEED PLANTING DEVICE AND METHOD OF USE

BACKGROUND

For a home gardener, planting seeds is often a difficult task that requires a significant amount of bending and stooping. The gardener must prepare soil, insert individual or small groups of seeds into the soil in carefully coordinated locations, and ensure the seeds have the conditions required to grow to maturity. It is often beneficial or necessary to ensure that seeds are planted in an orderly manner with regular spacing between each seed. The seeds also must be planted at a certain depth to provide the best growing conditions.

As the seeds develop and the plants begin to mature and grow, spacing between the planting sites of neighboring seeds helps to ensure that the root systems of neighboring plants do not become excessively interconnected; that each growing plant has access to required nutrients and sunlight. In large scale farming, mechanized planters are used to ensure the desired minimal distance between planted seeds. However, for home or small-scale gardening, there exists a need for an inexpensive, user-friendly device for ensuring the proper distance between planted seeds and to permit the gardener to plant with minimal bending, stooping, and excessive up-and-down activity. Such a device may also allow a gardener to plant seeds quickly, to ensure optimal and efficient use of garden space, and to accommodate gardening for those with physical limitations.

The subject matter claimed herein is not limited to embodiments that solve any disadvantages or that operate only in environments such as those described above. Rather, this background is only provided to illustrate one example technology area where some implementations described herein may be practiced.

SUMMARY

The present disclosure generally relates to a device for planting seeds with minimal physical discomfort. More particularly, the disclosure is directed towards a manual device for planting seeds at regularly spaced intervals without requiring stooping, bending, or excessive up-and-down activity of a practitioner, hobbyist, farmer, or gardener. In some embodiments, a planting device may include a platform having a top surface, a bottom surface, and an aperture. In some embodiments, the aperture is configured to receive either a projection that extends downwardly from the bottom surface, or to receive a planting tube that extends upwardly from the top surface. The projection and the planting tube may be interchangeable. In some embodiments, a planting system of the present invention comprises a first platform fitted with a plurality of projections, and a second platform fitted with a plurality of planting tubes. In some embodiments, a platform of the present invention further includes a handle extending from the top surface.

In some embodiments, the projection may include a plurality of projections regularly spaced apart. For example, the plurality of projections may be spaced apart by 2 inches, 3 inches, 4 inches, 5 inches, 6 inches, 7 inches, 8 inches, 9 inches, 10 inches, 11 inches, 12 inches, or greater than 12 inches. In some instances, the plurality of projections are positioned in one or more rows. Each projection may be configured to form a depression in soil. In some embodiments, the depression is configured to hold a seed or a seedling. In some embodiments, a height of the plurality of projections is set to make an impression in soil at a desired or optimal depth. In some instances, a height of the plurality of projections is adjustable. In some embodiments, the projection may be selectively coupled to the aperture, or may be coupled to the aperture by an interference fit, a bonding agent, or a fastener.

In some embodiments, the planting tube may include a plurality of planting tubes regularly spaced apart. For example, the plurality of planting tubes may be spaced apart by 2 inches, 3 inches, 4 inches, 5 inches, 6 inches, 7 inches, 8 inches, 9 inches, 10 inches, 11 inches, 12 inches, or greater than 12 inches. In some instances, the plurality of planting tubes are positioned in one or more rows. In some embodiments, the planting tube may include a length of tubing having a first end coupled to the aperture and extending through the platform, and a second end having an opening through which a seed or other element (such as a sprouted plant) is placed, such that the seed or other element falls through the planting tube to soil. In some instances, the second end of the planting tube is flared to form a funnel shape configured to assist the user in placing the seed or other elements into the planting tube. In some embodiments, a height of the planting tubes is set to provide user access while in a seated position. In some instances, a height of the planting tubes is adjustable. In some instances, a height of the planting tubes is fixed. In some embodiments, the planting tubes may be selectively coupled to the aperture, or may be coupled to the aperture by an interference fit, a bonding agent, or a fastener. In general, a height of the planting tubes is selected to prevent the handle from obstructing or otherwise limiting access to the opening of the planting tubes.

In some embodiments, the handle may include a container, where a portion of the handle may be shaped to selectively receive and support the container. In some instances, the container comprises a tray for holding the seed or other element prior to being placed in the planting tube.

In some embodiments, the seed planting device may further include a ridge or other indicator extending from a first edge of the bottom surface of the platform. The ridge may be configured to form an impression in soil, such as a line or other marker, wherein the impression is used to properly orient and align the base on the soil.

In some embodiments, a platform having a plurality of projections inserted within a plurality of apertures is configured for placement on soil, whereby the projections are pressed into the soil as the user steps on the top surface of the platform. The bottom surface of the platform contacts the soil and prevents further insertion of the projections into the soil. Using the handle, the user lifts the platform and projections from the soil, thereby revealing the plurality of depressions made in the soil. In some instances, the soil may further comprise an impression from at least one of the outer perimeter and a ridge from the bottom surface of the platform. The user may then align the platform with the previous depressions and/or impression and press the projections into the soil at an adjacent location, repeating this process until a desired number of depressions are made. In some instances, a height of the handle is set to facilitate use of the platform and projections while the user is standing.

In some embodiments, a platform having a plurality of planting tubes inserted within a plurality of apertures is configured for placement on soil, whereby the planting tubes are positioned and align over the plurality of depression made in the soil by the plurality of projections, wherein the spacing of the projections is identical to the spacing of the planting tubes. Once aligned, the user places seeds or other planting elements into the open end of each planting tube, whereby the seed or other element falls through the planting tube into the depression. In some instances, the user then pours a desired amount of soil down each planting tube to fill or partially fill the depression and cover at least a portion of the seed or other planting element. The user may then use the handle to move the platform to an adjacent set of depressions, repeating this process until seeds or other planting elements have been deposited into the previously made depressions. In some instances, a height of the handle is set to facilitate use of the platform and planting tubes while the user is seated.

In some embodiments, the handle may extend between 26 and 32 inches from the top surface of the platform. In some embodiments, a first end of the planting tube may be configured to couple to the aperture and a second end comprises a funnel. In some embodiments, the planting tube may extend between 20 and 28 inches from the top surface of the platform.

In some embodiments, a system for planting may include a first platform for preparing soil and a second platform for planting. In some embodiments, the first platform may include a top surface having a handle, a bottom surface, and a projection that extends from the bottom surface. In some embodiments, the projection is configured to form a depression in a soil. In some embodiments, the second platform may include a top surface having a handle, a bottom surface, and a planting tube extending through the second platform.

In some embodiments, when a force is applied to the top surface of the first platform the projection may form a depression in the soil, such that when the first platform is removed and the second platform is placed over the depression, the planting tube may be aligned with the depression such that when a practitioner places a seed through the planting tube such that the seed falls into the depression. In some embodiments, the system for planting further includes a ridge extending from a first edge of the bottom surface of the first platform and the second platform, where the ridge may be configured to form an impression in soil. In some embodiments, the ridge of the second platform is configured to align with the impression in the soil formed by the ridge of the first platform.

In some embodiments, a method for planting seeds in soil may include positioning a first platform for preparing soil, where the first platform includes a top surface having a handle, a bottom surface, and a projection that extends from the bottom surface. In some embodiments, the projection is configured to form a depression in a soil. In some embodiments, the method may also include applying a force to the top surface of the first platform such that the projection penetrates the soil to form a depression in the soil, and aligning a second platform over the depression. In some embodiments, the second platform may include a top surface having a handle, a bottom surface, and a planting tube extending through the second platform. In some embodiments, the method may further include placing a seed or seeds into the planting tube such that the seed falls through the planting tube into the depression and placing soil into the planting tube such that the soil falls through the planting tube and covers the seed.

It is to be understood that both the foregoing general description and the following detailed description are examples and explanatory and are not restrictive of the invention, as claimed. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE SEVERAL VIEWS OF THE DRAWINGS

Example embodiments will be described and explained with additional specificity and detail through the use of the accompanying figures in which.

DESCRIPTION OF EMBODIMENTS

Figure 1B:
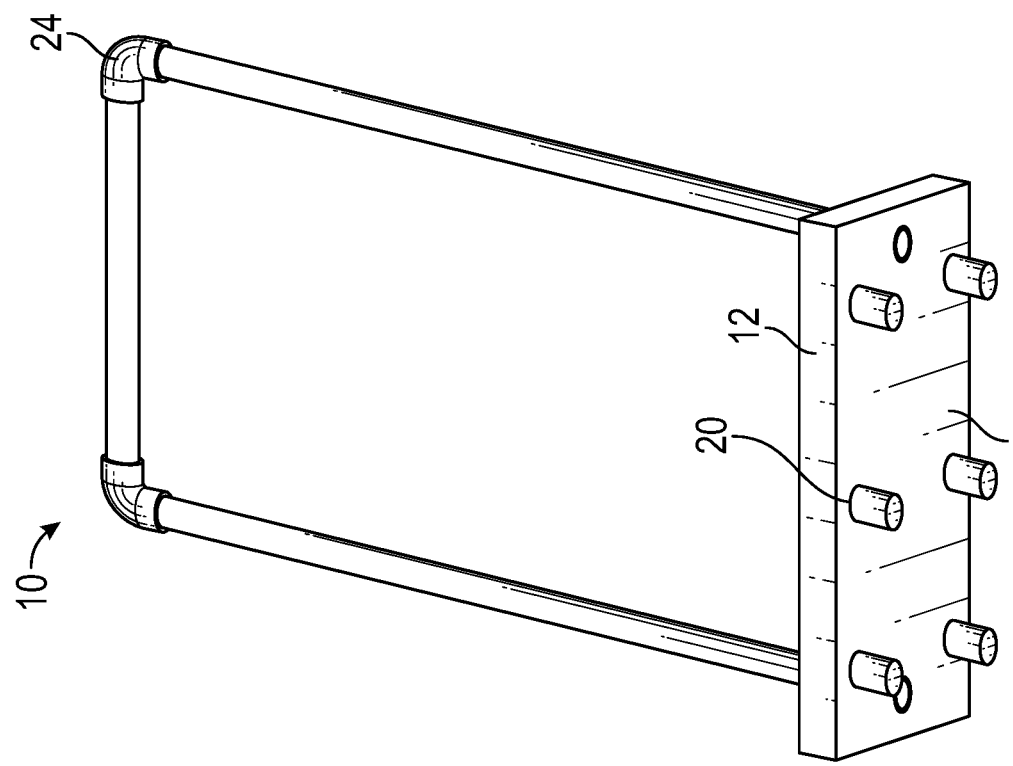
FIG. 1B is a lower perspective view of a planting device, according to some embodiments.
Figure 1A:
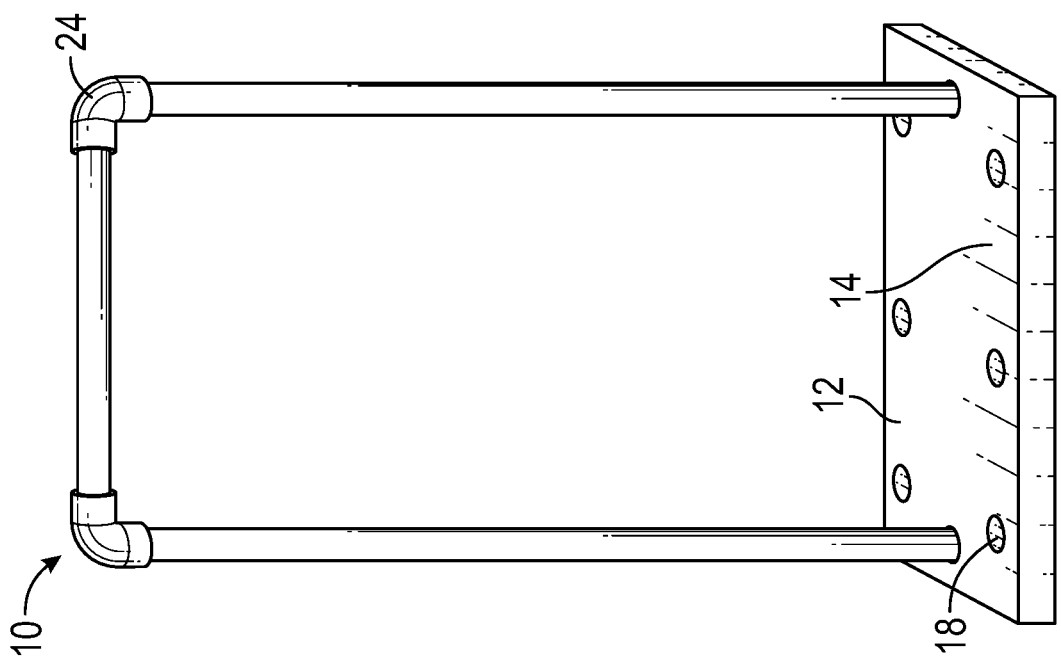
FIG. 1A is an upper perspective view of a planting device, according to some embodiments.
Figure 1C:
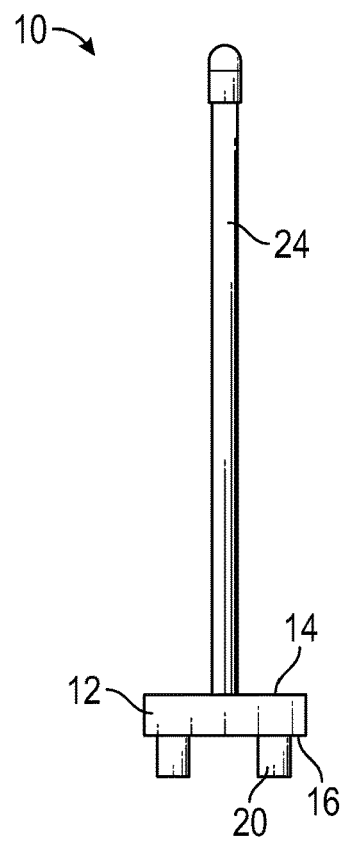
FIG. 1C is an end view of a planting device, according to some embodiments.
Figure 1D:
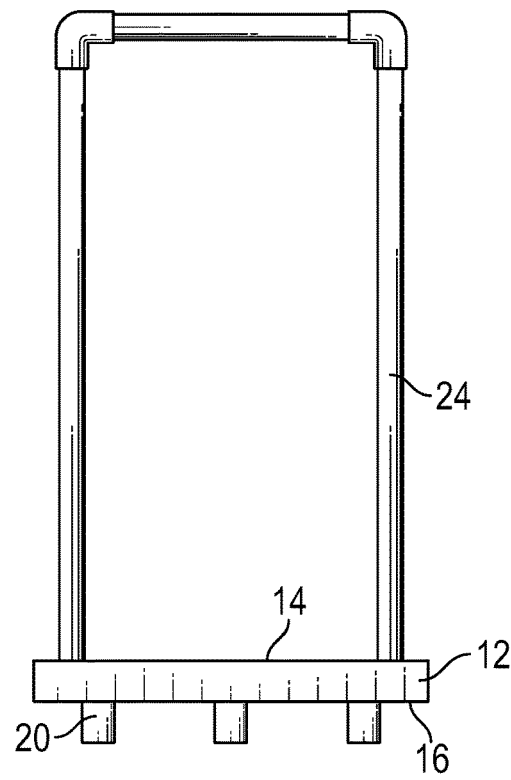
FIG. 1D is side view of a planting device, according to some embodiments.

For the purpose of promoting an understanding of the principles of the invention, reference will now be made to the embodiments illustrated in the figures and specific language will be used to describe them. It will nevertheless be understood that no limitation of the scope of the invention is thereby intended. Such alterations and further modifications in the illustrated system, and such further applications of the principles of the invention as would normally occur to those skilled in the art are to be construed as being within the scope of the present invention.

The term "embodiment", "example", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Referring now to FIGS. 1A-1E, in some embodiments, a practitioner may use a planting device 10 for planting seeds, seedlings, sprouts, or any other suitable item into soil. In some embodiments, the planting device 10 may include a platform 12 having a top surface 14, a bottom surface 16, and an aperture 18. In some embodiments, the platform 10 may be manufactured from wood, plastic, metal, or any suitable material. In some embodiments, the platform 10 may be coated with a paint or stain to preserve the platform from detrimental environmental effects such as corrosion and/or rot. In some embodiments, the platform 10 may be a treated lumber. In some embodiments, the platform 10 may further include a coating or additional suitable surface material to increase grip of the platform 10.

In some embodiments, a projection 20 may extend from the bottom surface 16. In some embodiments the projection 20 may be configured to couple to the aperture 18. In some embodiments, the projection 20 may be constructed of wood, metal, plastic, or any suitable material. In some embodiments, the projection 20 may be a solid peg of wood. In some embodiments, the projection 20 may be configured to form a depression in soil. In some embodiments, the projection 20 may be coupled to the aperture 18 such that when the platform 12 is placed on the ground or over soil and a force is applied to the top surface of the platform 12, the projection extends into the soil. In some embodiments, the projection forms a depression in the soil that remains when the platform 12 and projection 20 are removed.

In some embodiments, a length and/or shape of the depression may be suitable for holding a seed, group of seeds, or a seedling. In some embodiments, the length and/or shape of the projection 20 may vary as required by the plant or the practitioner, and be any suitable length and/or diameter. In some embodiments, the depression may be sized to receive various types of seeds and may be large and deep enough to contain a substantial portion of a seed. In some embodiments, the length of the projection 20 may be between 0.5 inches and 3 inches. In some embodiments, the projection 20 may be 1-2 inches in length. In some embodiments, the projection 20 may be between 0.5 and 1 inches. In some embodiments, the diameter may be greater than 1 inch. In some embodiments, a projection 20 may have a sharp end to penetrate hard soil. In other embodiments, the projection 20 may have a flat or rounded end that extends into the soil.

In some embodiments, the projection 20 may be coupled to the aperture 18 by an interference fit, a bonding agent, or a fastener. In some embodiments, the projection 20 may be removable and replaceable. In some embodiments, for example, a shorter projection may be decoupled from the aperture 18 and replaced with a longer projection. In some embodiments, a projection 20 having a small diameter may be removed and replaced by a projection having a larger diameter. A practitioner may choose projections that are suitable to the soil conditions, plant species, type of seed or seedling, or any other relevant condition.

Figure 1E:
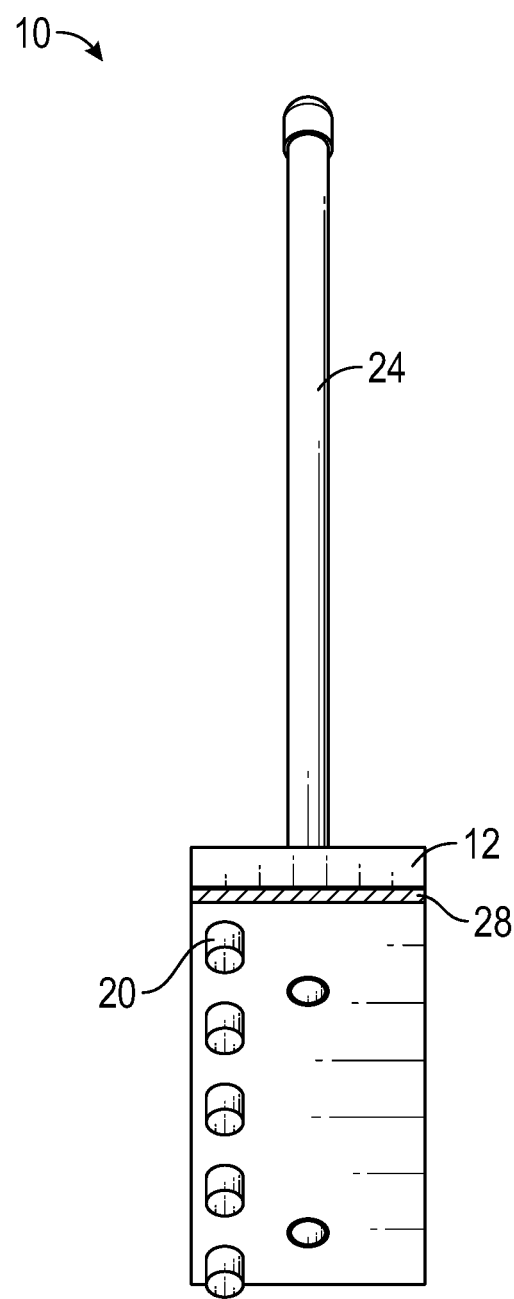
FIG. 1E is a lower perspective view of a planting device, according to some embodiments.

In some embodiments, the projection 20 may be a plurality of projections 20. In some embodiments, the plurality of projections 20 may be spaced apart at regular intervals extending from the bottom surface 16 of the platform 12. In some embodiments, the intervals may be any suitable length for optimum plant growth. In some embodiments, the intervals may be chosen dependent on the particular seed that is to be planted. In at least one embodiment, the projections 20 may extend from only one side of the platform or offset from the center as illustrated in FIG. 1E. In some embodiments, the intervals may be adjustable to suit required or preferred intervals.

In some embodiments, the aperture 18 may include a plurality of apertures 18. In some embodiments, the aperture may be configured to couple to the projection 18. In other embodiments, the aperture may include a plurality of projections 18. In yet other embodiments, the number and/or size of the projection in the aperture may be varied. In some embodiments, the aperture 18 may be circular. In other embodiments, the aperture 18 may be a channel or groove into which the projections may be inserted and/or fastened.

In some embodiments, the planting device 10 may include a handle 24 extending from the top surface 14. In some embodiments, the handle 24 may be constructed of a rigid material such as metal, plastic, or wood. In some embodiments, the handle 24 may extend upwardly from the top surface 14 a suitable distance, according to the application of the planting device 10. The length of the handle will determine the position of the body of the practitioner when using the planting device 10. In some embodiments, the length of the handle may extend between 26 and 32 inches from the top surface of the platform. In this embodiment, the practitioner may use the planting device 10 while standing and may apply a force to the top surface 14 of the platform 12 by placing a foot or stepping on the top surface 14, such that the projection 20 may extend into the soil.

In some embodiments, the handle 24 may extend between 16 and 26 inches from the top surface of the platform. In this embodiment, the practitioner may again use the planting device 10 while standing or while seated and may again apply a force to the top surface 14 of the platform 12 by placing a foot or stepping on the top surface 14. In other embodiments, the handle 24 may extend between 6 and 16 inches from the top surface of the platform. In this embodiment, the practitioner may use the planting device 10 kneeling or within a raised flowerbed or planting container while standing or while seated and may apply a force to the top surface 14 of the platform 12 by placing a hand on the top surface 14 or striking the top surface 14, such that the projection 20 may extend into the soil.

In some embodiments, the handle 24 may be coated with a paint or stain to preserve the handle 24 from detrimental environmental effects such as corrosion and/or rot. In some embodiments, the handle 24 may be treated lumber or PVC. In some embodiments, the handle 14 may further include a coating or additional suitable surface material to increase grip of the handle 14.

Referring now to FIGS. 2A-2D, in some embodiments, the projection 18 may be interchanged with a planting tube 22. In some embodiments, the planting tube 22 may extend from the top surface 14 and may be configured to couple to the aperture 18. In some embodiments, the planting tube 22 may be removable and/or replaceable. In some embodiments, the projection 20 and the planting tube 22 are interchangeable.

In some embodiments, the planting tube 22 may include a plurality of planting tubes 22. In some embodiments, the plurality of planting tubes 22 may be spaced apart at regular intervals extending from the top surface 14 of the platform 12. In some embodiments, planting tube 22 or the plurality of planting tubes 22 are configured to align with the depression in the soil formed previously by the projection 20 or plurality of projections 20. As discussed previously with the plurality of projections 20, the intervals between the plurality of planting tubes 22 may be any suitable distance for optimum plant growth. In some embodiments, the intervals may be adjustable to suit required or preferred intervals. In some embodiments, the aperture 18 may be configured to couple to the planting tube 22. In other embodiments, the aperture 18 may include a plurality of planting tubes 22. In yet other embodiments, the number and/or size of the planting tube in the aperture may be varied. In some embodiments, the aperture 18 may be circular. In other embodiments, the aperture 18 may be a channel or groove into which the planting tubes 22 may be inserted and/or fastened.

In some embodiments, the planting tube 22 may include a length of tubing coupled to and extending through the platform 12 at a first end, where a seed or other element may be placed in an opening at a second end, allowing said seed to fall through the planting tube into soil. In some embodiments, the platform 12 and aperture 18 are configured to align the planting tube 22 over a depression in soil made by the projection 20, such that a seed or other element falls through the planting tube 22 into the previously-formed depression. In some embodiments, the planting tube 22 may be aligned over the depression prior to moving the platform 12 after interchanging the projection 20 and the planting tube 22. In other embodiments, the platform may include a feature to allow the planting tube 22 to be superimposed over the depression after the projection 20 and the planting tube 22 have been interchanged.

In some embodiments, the planting tube 22 may be configured to extend through the platform 12 and the length of tubing may extend to a suitable height above the top surface 14 of the platform. In some embodiments, the planting tube 22 may extend between 20 and 28 inches from the top surface of the platform 12. In some embodiments, the planting tube 22 may extend to a height where a practitioner may access the second end of the planting tube in a standing or a sitting position. In some embodiments, the height of the planting tube 22 may be adjustable. In some embodiments, the planting tube 22 may be interchangeable between a planting tube 22 having preferred features. In some embodiments, for example, a shorter planting tube 22 may be decoupled from the aperture 18 and replaced with a longer planting tube 22. In some embodiments, a planting tube 20 having a small diameter may be removed and replaced by a planting tube 22 having a larger diameter. A practitioner may choose planting tubes 22 that are suitable to the preferences of the practitioner, plant species, type of seed or seedling, or any other relevant condition.

Figure 2B:
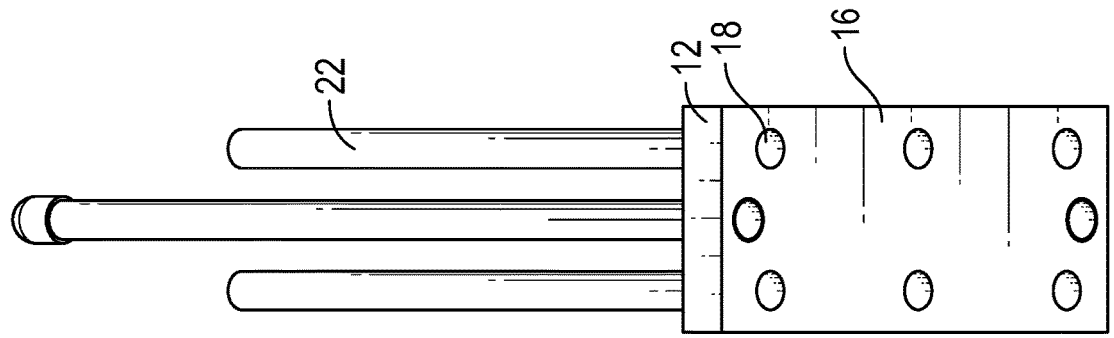
FIG. 2B is a lower perspective view of a planting device, according to some embodiments.
Figure 2A:
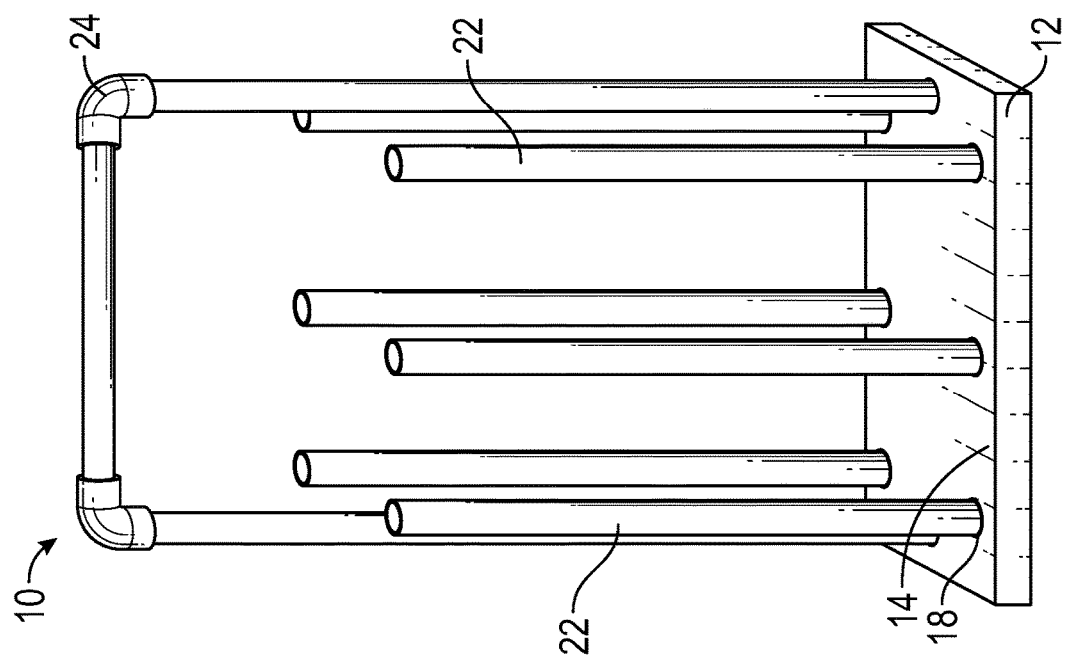
FIG. 2A is an upper, front and end perspective view of a planting device, according to some embodiments.
Figure 2D:
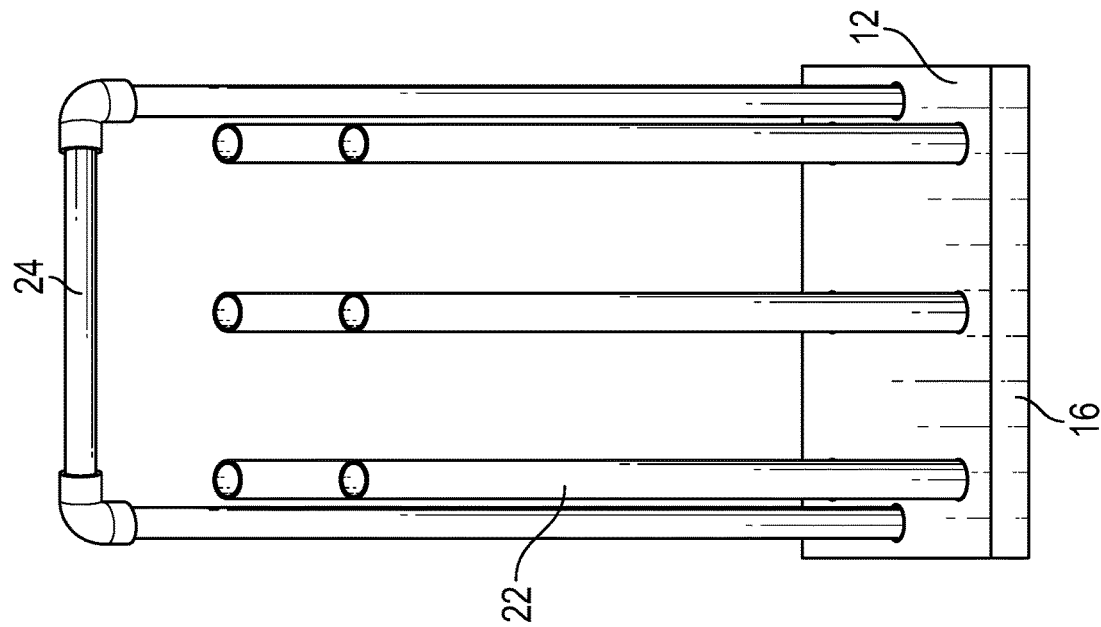
FIG. 2D is an upper, front view of a planting device, according to some embodiments.
Figure 2C:
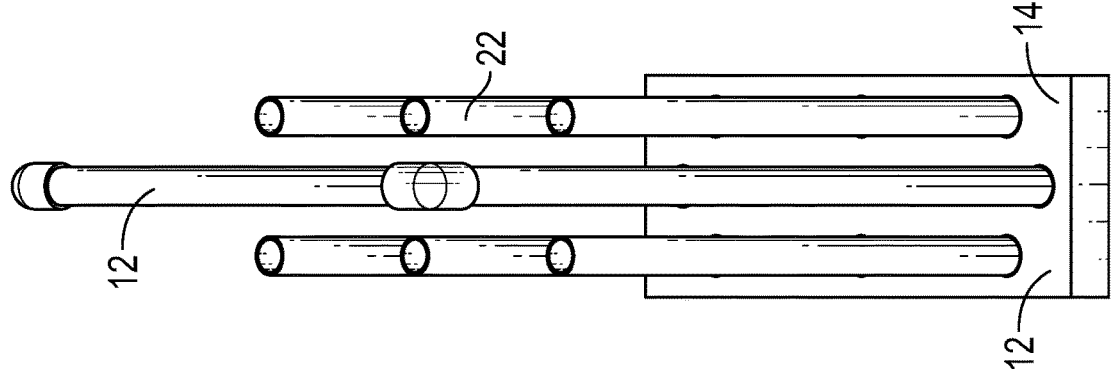
FIG. 2C is an upper, end perspective view of a planting device, according to some embodiments.
Figure 2E:
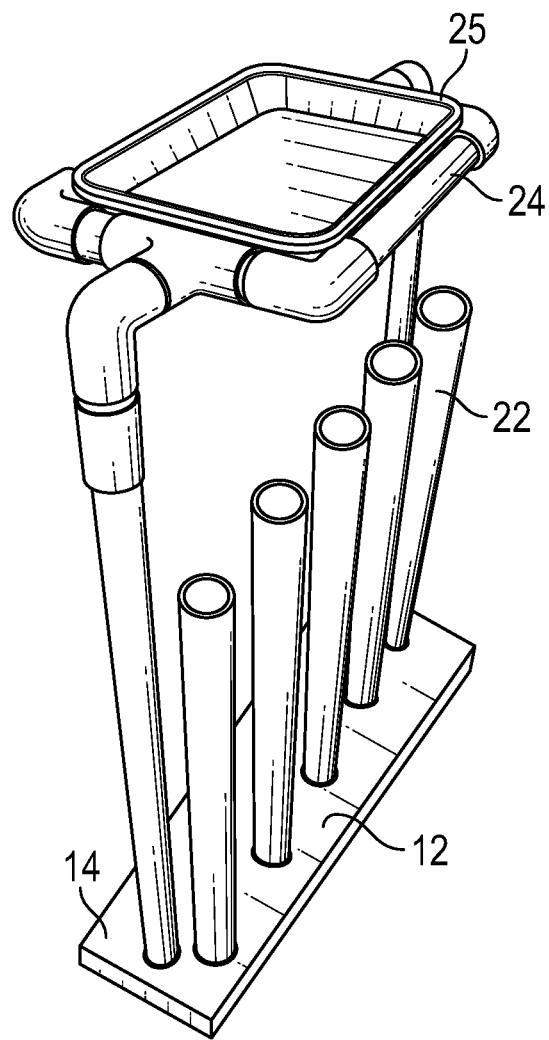
FIG. 2E is a perspective view of a planting device, according to some embodiments.

Referring now to FIG. 2E, in some embodiments, the handle 24 may include a container 25. In some embodiments, the handle 24 may be shaped such that the container 25 removably couples to the handle 24. In some embodiments, the container 25 may include a clip that couples to the handle 24. In some embodiments, the handle is shaped such that the container 25 fits into a portion of the handle 24 by an interference fit. In some embodiments, the container 25 and the handle 24 may be monolithically formed as a single unit. The container 25 may be a dish, bin, tray, or bag that may be configured to hold seeds, seedlings, or other planting element such that the element may be easily accessed while planting.

Figure 3:
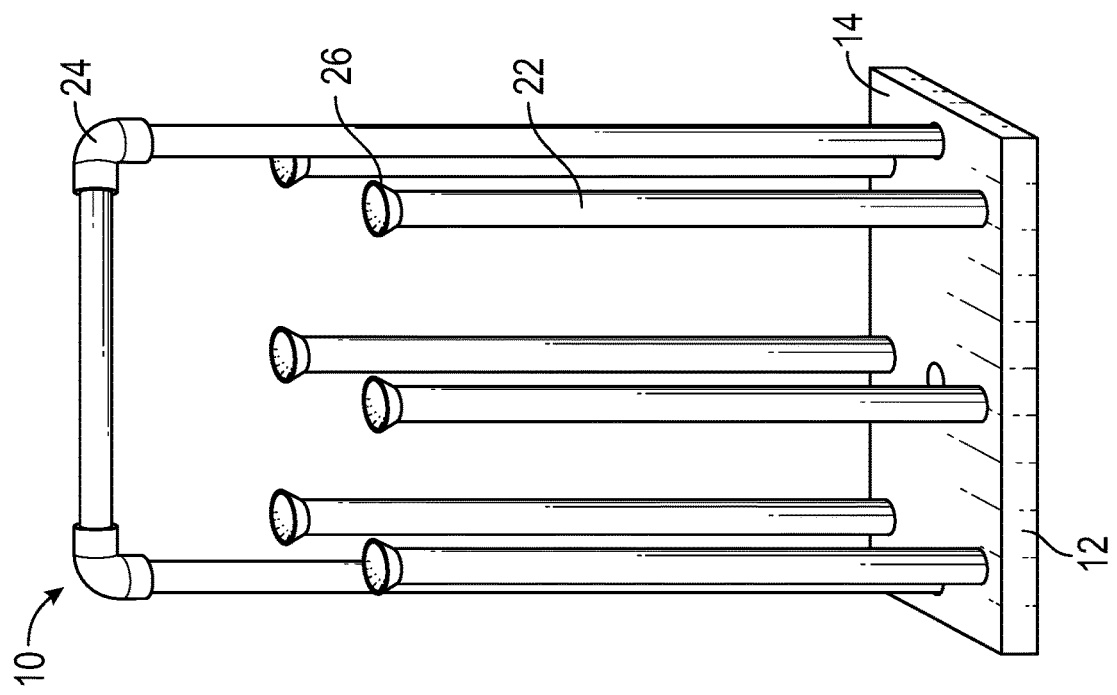
FIG. 3 is an upper perspective view of a planting device, according to some embodiments.

Referring now to FIG. 3, in some embodiments, the planting tube 22 may include a first end of the planting tube 22 configured to couple to the aperture 18 and a second end may include a funnel 26. In some embodiments, the funnel 26 may minimize the errors of the practitioner placing the seed or other element into the second end of the planting tube 22. In some embodiments, the other elements inserted into the planting tubes may include additional seeds, fertilizers, nitrates, soil, compost, water, and any other suitable element for planting. Thus, the funnel 26 may minimize losses and ensure the seed or other element falls through the planting tube 22 and into the depression in the soil.

Figure 4:
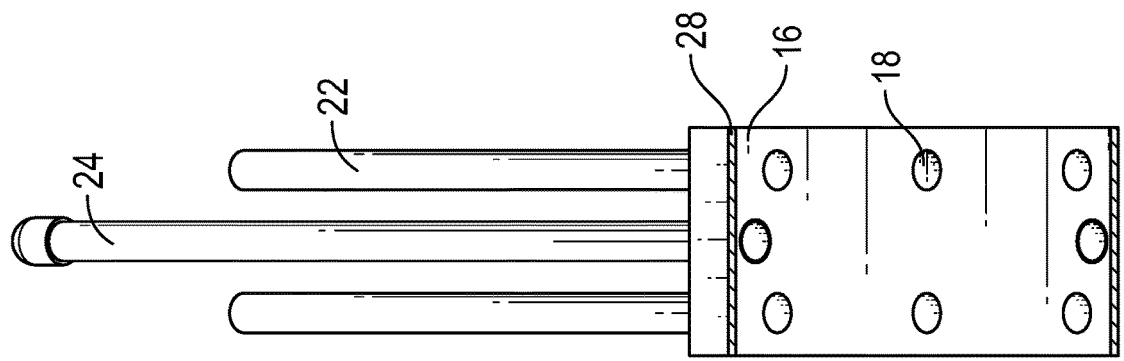
FIG. 4 is a lower perspective view of a planting device, according to some embodiments.

Referring now to FIG. 4, in some embodiments, the platform 12 may include a ridge 28 extending from a first edge of the bottom surface 16 of the platform 12. In some embodiments, the ridge 28 may be configured to form an impression in soil. In other embodiments, the platform 12 may include a ridge 28 on both a first and a second edge of the bottom surface 16 of the platform 12. In some embodiments, as an example, the platform 12 having the projection 20 may be placed on the ground in a first location and a force applied to the top surface 14 such that the projection 20 forms a depression in the soil and the ridge 28 forms an impression in the soil. Planting device 10 having the platform 12 coupled to projection 20 may then be moved from the first location to a second location and so on to make other depressions in soil. After the projection 20 is interchanged with the planting tube 22, the planting device 10 is returned to the first location where the ridge 28 is realigned with the impression left by the ridge 28. Thus, by realigning the ridge 28, the planting tube 22 is superimposed over the depression in soil formed by the projection 20, and a seed or other element may be placed in the planting tube 22 such that said seed falls through the planting tube 22 into the depression in the soil.

In some embodiments, a planting system is provided comprising a first platform having a plurality of projections, and a second platform comprising a plurality of planting tubes, wherein the first platform is first used to make depressions in the soil, and the second platform is used to place seeds in the depressions. In some instances, the handle of the first platform comprises a height to facilitate use of the first platform while the user is standing, and the handle of the second platform comprises a height to facilitate use of the second platform while the user is seated.

A method for planting seeds in soil may include positioning a first platform for preparing soil, where the first platform may include a top surface having a handle, a bottom surface, and a projection that extends from the bottom surface. In some embodiments, the projection may be configured to form a depression in a soil. The method may include applying a force to the top surface of the first platform such that the projection penetrates the soil to form a depression in the soil. The method may further include aligning a second platform over the depression, where the second platform may include a top surface having a handle, a bottom surface, and a planting tube extending through the second platform. The method may also include placing a seed or seeds into the planting tube such that the seed falls through the planting tube into the depression and then placing soil or any other suitable element into the planting tube such that the soil falls through the planting tube and covers the seed. In some embodiments, the practitioner may then repeat the process to continue planting seeds regularly spaced apart.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A planting device, comprising:
   a platform having a top surface, a bottom surface, and a
   horizontal midline defining a first half and a second half, said first half having a first aperture forming a first pathway between the top and bottom surfaces, and said second half having a second aperture positioned opposite the first aperture and forming a second pathway between the top and bottom surfaces, wherein either a projection that extends downward from the bottom surface or a planting tube that extends upward from the top surface is configured to couple to the first aperture or the second aperture, wherein the projection and the planting tube are interchangeable; wherein the planting tube comprises a length of tubing coupled to and extending through the platform at a first end, wherein a seed or other element is placed in a second end such that said element falls through the planting tube to soil; and a handle coupled to the top surface at and along the midline and extending upward from the top surface, wherein the handle is misaligned with the first and second apertures.

2. The planting device of claim 1, wherein the first aperture comprises a plurality of first apertures regularly spaced apart, and said projection comprises a plurality of projections regularly spaced apart, wherein each projection is configured to form a depression in soil.

3. The planting device of claim 1, wherein the second aperture comprises a plurality of second apertures regularly spaced apart, and said planting tube comprises a plurality of planting tubes regularly spaced apart.

4. The planting device of claim 1, further comprising a ridge extending from a first edge of the bottom surface of the platform, wherein the ridge is configured to form an impression in soil.

5. The planting device of claim 1, wherein the projection and the planting tube couple to the first or second apertures by an interference fit, a bonding agent, or a fastener.

6. The planting device of claim 1, wherein the handle comprises a container, wherein the handle is shaped to selectively receive the container.

7. The planting device of claim 1, wherein the handle extends between 26 and 32 inches from the top surface of the platform.

8. The planting device of claim 1, wherein the first end of the planting tube is configured to couple to the first or second apertures and the second end comprises a funnel.

9. The planting device of claim 1, wherein the planting tube extends between 20 and 28 inches from the top surface of the platform.

10. A method for planting seeds in soil, comprising:

providing a platform having a top surface, a bottom surface, and a horizontal midline defining a first half and a second half, said first half having a first aperture forming a first pathway between the top and bottom surfaces, and said second half having a second aperture positioned opposite the first aperture and forming a second pathway between the top and bottom surfaces, said platform further comprising a handle coupled to the top surface at and along the midline and extending upward from the top surface, wherein the handle is misaligned with the first and second apertures;

preparing soil by i) affixing a protrusion to the first aperture, wherein a projection extends downwardly from the bottom surface, and ii) applying a downward force to the top surface of the platform such that the projection penetrates the soil to form a depression in the soil; and planting a seed by i) affixing a planting tube to the second aperture, wherein the planting tube extends upwardly from the top surface, ii) aligning the planting tube over the depression, iii) placing the seed into the planting tube such that the seed falls through the planting tube into the depression, and iv) placing soil into the planting tube such that the soil falls through the planting tube and covers the seed.

11. A planting device, comprising:

a platform having a top surface, a bottom surface, and a horizontal midline defining a first half and a second half, said first half having a first aperture forming a first pathway between the top and bottom surfaces, and said second half having a second aperture positioned opposite the first aperture and forming a second pathway between the top and bottom surfaces, wherein either a projection that extends downward from the bottom surface or a planting tube that extends upward from the top surface is configured to couple to the first aperture or the second aperture, wherein the projection and the planting tube are interchangeable, wherein a first end of the planting tube is configured to couple to the first or second apertures and a second end comprises a funnel; and a handle coupled to the top surface at and along the midline and extending upward from the top surface, wherein the handle is misaligned with the first and second apertures.

12. The planting device of claim 11, wherein the first aperture comprises a plurality of first apertures regularly spaced apart, and said projection comprises a plurality of projections regularly spaced apart, wherein each projection is configured to form a depression in soil.

13. The planting device of claim 11, wherein the second aperture comprises a plurality of second apertures regularly spaced apart, and said planting tube comprises a plurality of planting tubes regularly spaced apart.

14. The planting device of claim 11, wherein the planting tube comprises a length of tubing coupled to and extending through the platform at the first end, wherein a seed or other element is placed in the second end such that said element falls through the planting tube to soil.

15. The planting device of claim 11, further comprising a ridge extending from a first edge of the bottom surface of the platform, wherein the ridge is configured to form an impression in soil.

16. The planting device of claim 11, wherein the projection and the planting tube couple to the first or second apertures by an interference fit, a bonding agent, or a fastener.

17. The planting device of claim 11, wherein the handle comprises a container, wherein the handle is shaped to selectively receive the container.

18. The planting device of claim 11, wherein the handle extends between 26 and 32 inches from the top surface of the platform.

19. The planting device of claim 11, wherein the planting tube extends between 20 and 28 inches from the top surface of the platform.

* * * * *